(12) United States Patent
Takenouchi et al.

(10) Patent No.: US 6,178,010 B1
(45) Date of Patent: Jan. 23, 2001

(54) IMAGE PROCESSING DEVICE

(75) Inventors: Osamu Takenouchi; Hiroyoshi Uejo, both of Ebina (JP)

(73) Assignee: Fuji Xerox Co., Ltd., Tokyo (JP)

( * ) Notice: Under 35 U.S.C. 154(b), the term of this patent shall be extended for 0 days.

(21) Appl. No.: 08/982,511

(22) Filed: Dec. 2, 1997

(30) Foreign Application Priority Data

Dec. 10, 1996 (JP) .................................................. 8-329964

(51) Int. Cl.[7] .............................. G06K 15/02; G06K 9/34; G06K 9/44; H04N 1/409
(52) U.S. Cl. ............................ 358/1.9; 382/264; 382/266; 382/176; 382/199
(58) Field of Search ....................................... 382/261, 260, 382/266, 264, 269, 176, 173, 177, 175, 195, 164, 165; 358/448, 462, 1.9

(56) References Cited

U.S. PATENT DOCUMENTS 5,778,156  *  7/1998  Schweid et al. ........................ 395/61
5,825,937  *  10/1998 Ohuchi et al. ....................... 382/261

* cited by examiner

*Primary Examiner*—Scott Rogers
(74) *Attorney, Agent, or Firm*—Oliff & Berridge, PLC

(57) ABSTRACT

The image processing device of this invention processes an input document and performs a separation function which separates the text area and the image area from the input document. The image processing device first determines and coarsely separates the text area and the image area, then corrects the image quality. Then, the corrected image is finely separated into text area and image area, and corrected again. Logic calculation may be performed on the corrected images to further correct the image quality.

5 Claims, 11 Drawing Sheets

ON THE ORIGINAL DOCUMENT 4-4

ON THE COPY OUTPUT 4-7

LOOK-UP TABLE CONTENT 11-1 IN TONE CONTROL

EDGE DETERMINATION RESULT

OUTPUT PIXEL

IMAGE PROCESSING DEVICE

BACKGROUND OF THE INVENTION

1. Field of Invention

This invention relates to an image processing device, and more particularly to an area separation function which separates the text area and the image area derived from an input image.

2. Description of Related Art

In a digital copier for reading color and/or monochrome original documents and outputting color and/or monochrome documents, an optimal output image is determined by distinguishing between the text area and the image area of an input image by a text/image area separation function, and by changing the processing, calculation parameters, and the like relating to each area.

In the text/image are separation method, when a relatively broad area (for example a 33×33 pixel boundary) of the input image is used to perform text/image determination, a problem occurs where it is difficult to determine the text portion when small point, thin multiple image letters are used and are often mistaken determined to be images (design portions), causing an adverse effect on producing an optimum output image.

SUMMARY OF THE INVENTION

An object of this application, in view of the above described circumstances, is to provide an image processing device capable of performing processing suitable for image portions and text portions.

In order to solve the problem described above, the image processing device uses a first determination means for performing image area separation for input image data by coarse area determination of the input image data, followed by a first image quality correction means correcting the image quality for the input image data based on an image area separation result determined by the first determination means. A second determination means is used for determining image characteristics for the input image data by performing fine area determination, and a second image quality correction means is used to correct the image quality based on the image characteristics determined by the second determination means.

In a second embodiment of the invention, the image processing device uses a first determination means for performing image area separation for input image data by coarse area determination of the input image data, followed by a first image quality correction means correcting the image quality for the input image data based on image area separation results determined by the first determination means. A second determination means is used for determining image characteristics for the input image data by performing fine area determination, followed by a logic calculation means for performing logic calculations using the determination results of at least the first and second determination means, and a second image quality correction means correcting the image quality based on the calculation result of the logic calculation means.

DETAILED DESCRIPTION OF PREFERRED EMBODIMENTS

The following explains embodiments of the invention with reference to the figures.

Figure 1:
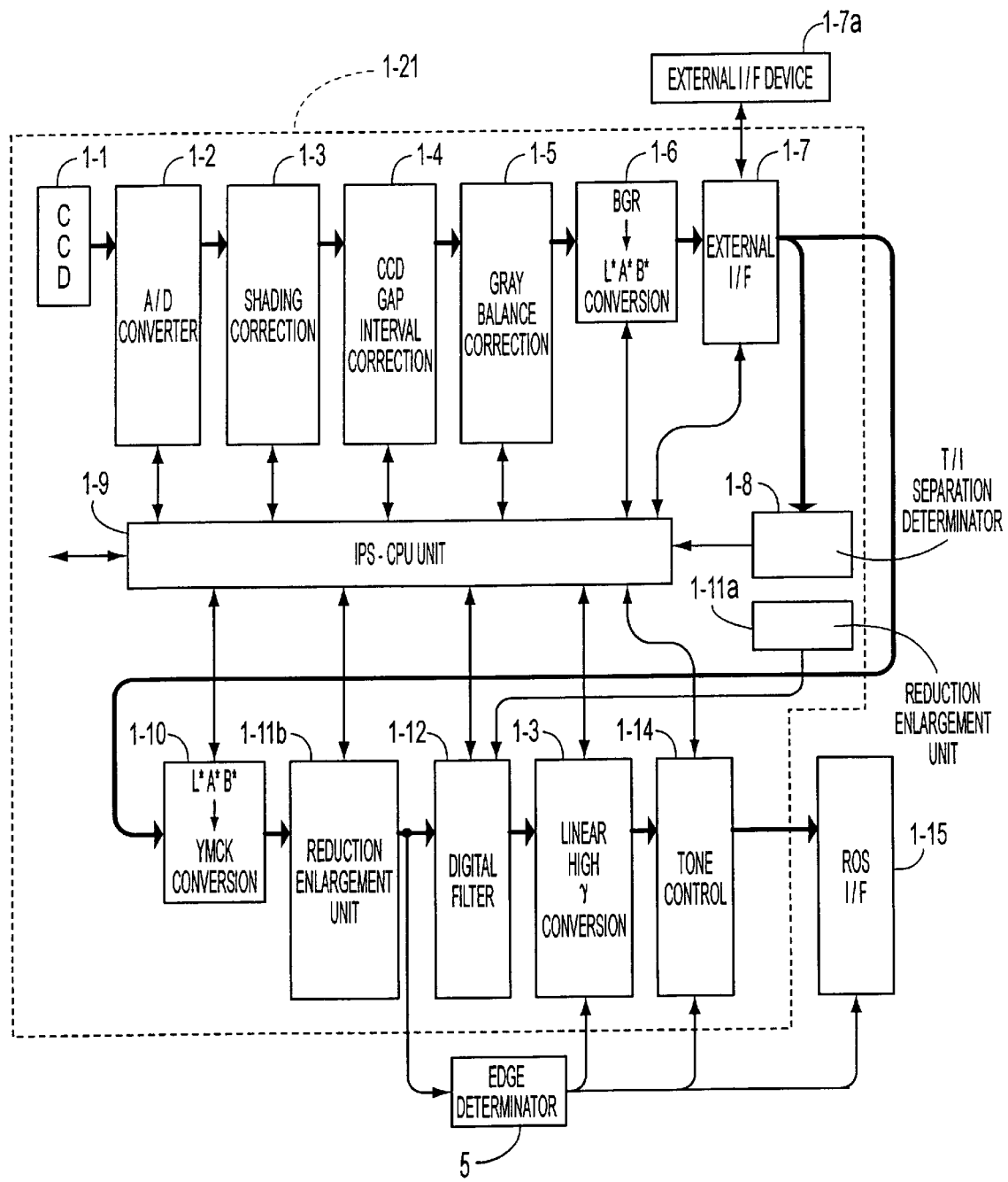
FIG. 1 is a block diagram showing the composition of essential parts of the image processing device in the first embodiment of the invention.
Figure 2:
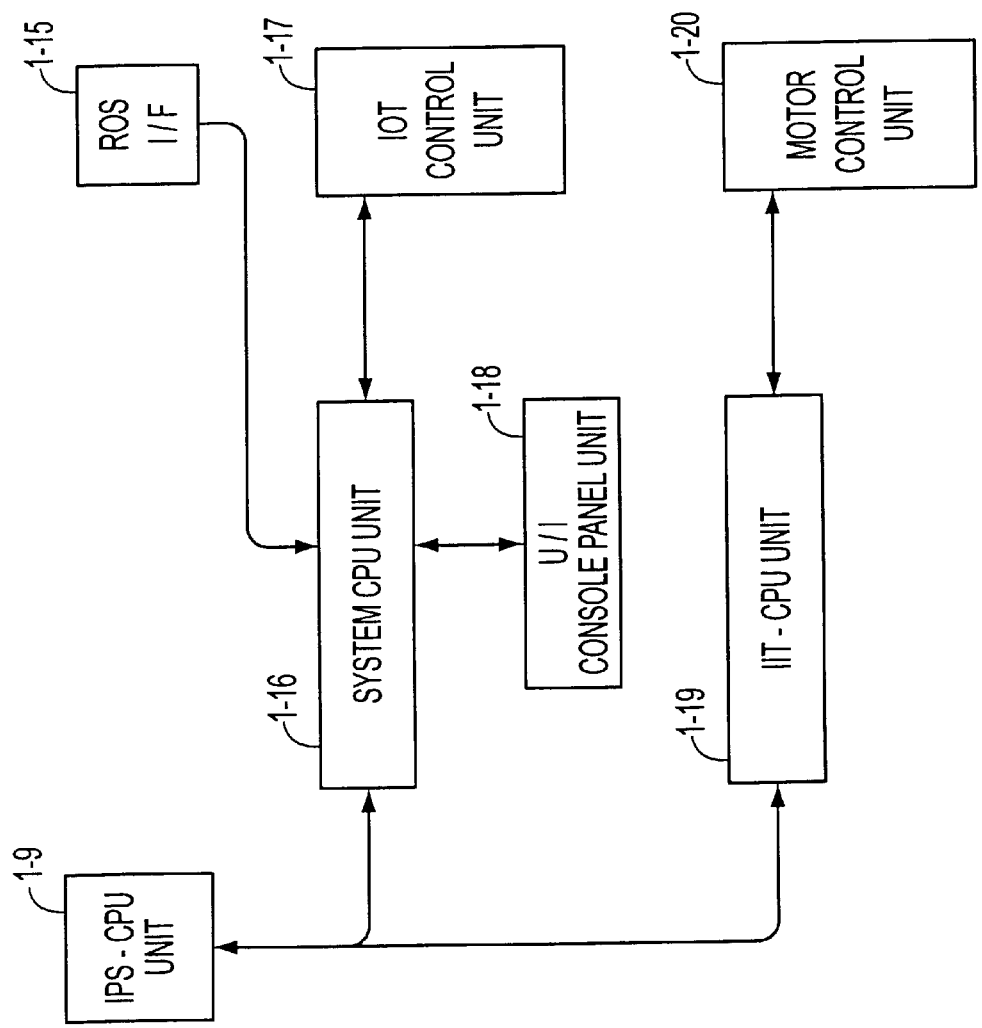
FIG. 2 is a block diagram showing the top level configuration of the image processing device in the first embodiment of the invention.

FIG. 1 and FIG. 2 are block diagrams showing the structure of the embodiment. A charge-coupled device (CCD) sensor 1-1 (for a 3-line component of red, green and blue) reads sequentially, line-by-line, the image of the original document on the original document plate. The image signal output from the CCD sensor 1-1 is converted to digital signals by the A/D converter 1-2. Next, the digital signals are input to the shading corrector 1-3 where shading is corrected, and the corrected signals are then input to the gap corrector 1-4 in order to correct the gaps between each read pixel (Red, Green, Blue) of the CCD sensor 1-1. The gap corrected image signal is input to the gray balance corrector 1-5 where gray balance correction is performed, then converted in the color space interval converter 1-6 from Red, Green, and Blue to L*, a*, and b* color space interval.

The converted color space interval image signal is output via the external I/F unit 1-7 to the external I/F device 1-7A, as well as being supplied to a text/image (T/I) separation determinator 1-8 and YMCK (yellow, magenta, cyan and black) converter 1-10. The T/I separation determinator 1-8 performs the broad scope determination of the input image by commonly known methods and separates the text area (T) and the image area (I), and in parallel the YMCK converter 1-10 converts the image signal of the spatial interval L*, a*, and b* to the respective values of Y, M, C, and K (yellow, magenta, cyan, black). The image signals converted to YMCK are reduced or enlarged by the reducer/enlarger 1-11b. When there are image areas, a smoothing of the border lines is performed, and when there are text areas, processing such as edge enhancement (emphasizing the edges) is performed by the digital filter unit 1-12. Then in the image areas, linear processing is performed and a smooth image is made by the linear High-γ processor 1-13; while in the text area, High-γ processing is performed, and the outline portion of the text is made distinct. Then, the image signals tone control is processed by the tone controller 1-14 and are input into the raster output scanner (ROS-I/F) 1-15. In the raster output scanner 1-15, based on the data of each of the respective colors (Y, M, C, K) of the image signal, development is performed for each color (Y, M, C, K) by a method using a laser beam or the like and by an electrostatic copying method to obtain a full color copy.

Meanwhile, the determination result of the T/I separation determinator 1-8 is reduced or enlarged by the reducer/enlarger 1-11a and is input into the digital filter 1-12 as a control signal. Once the reducer/enlarger 1-11a has reduced or enlarged the image signal by the reducer/enlarger 1-11b, because of the necessity to make this correspond as well to the area determination result of the T/I separation determinator 1-8, reduction/enlargement processing is performed to prevent shifting in the corresponding relationship between both of them.

An edge determinator 5 determines the edge portion of the image signal using pattern comparison and the like, with the determination results fed as a control signal to the tone control unit 1-14 and to the raster output scanner (ROS-I/F) 1-15.

Additionally, the IPS-CPU unit 1-9, in controlling each unit described above, performs the transfer, via a bus, of the processing content, state and the like for each process. Furthermore, the IPS-CPU unit 1-9, as shown in FIG. 2, is tied into the system—CPU unit 1-16 by a communication line to perform transfer of the control state and the like. Here, the system—CPU unit 1-16 performs control of the Image Output Terminal (IOT) control unit 1-17 and the control of the User Interface (UI) console panel unit 1-18.

The following explains a sample operation of embodiment 1. First, the processing for text section 2-2 in a mixed image/text original document of an original document 2-1 for a document read in, shown in FIG. 3, is explained.

Figure 3:
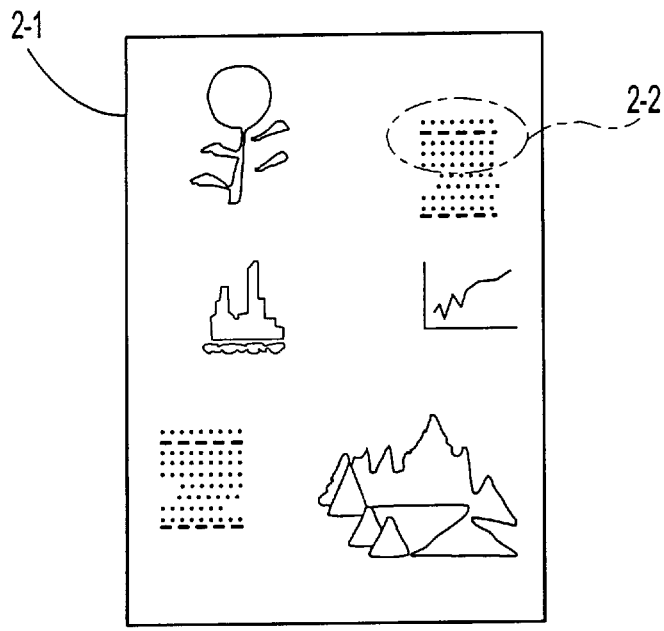
FIG. 3 is an example of an input image.
Figure 4A:
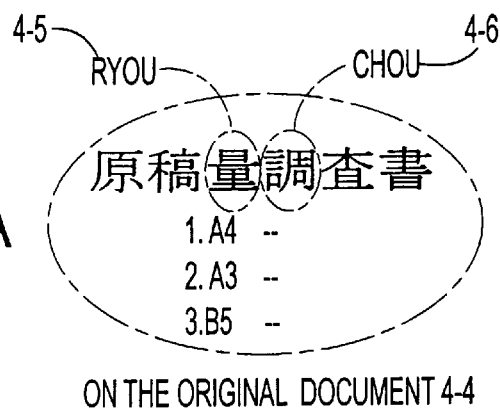
FIG. 4A is an enlarged part of the input image from FIG. 3.

The enlarged part of the text section 2-2 in the original document 2-1 shown in FIG. 3 becomes is shown as section 4-4 of FIG. 4A. In the text section 4-6 of section 4-4, the focus is the processing of the Chinese character, chou.

Figure 5A:
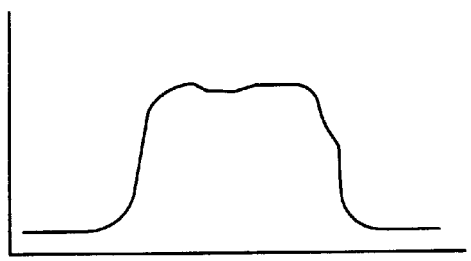
FIGS. 5A–5C are waveform figures showing an example of image signals.

In the event that the waveform of the image signal input into the digital filter unit 1-12, shown in FIG. 5(a), when the T/I separation determinator 1-8 is determined to be a text area, this determination result is input as a control signal to the digital filter 1-12 via the reducer/enlarger 1-11a. Because of this, digital filter 1-12 performs processing suitable to the text area and a waveform results shown in FIG. 5(c).

Figure 4B:
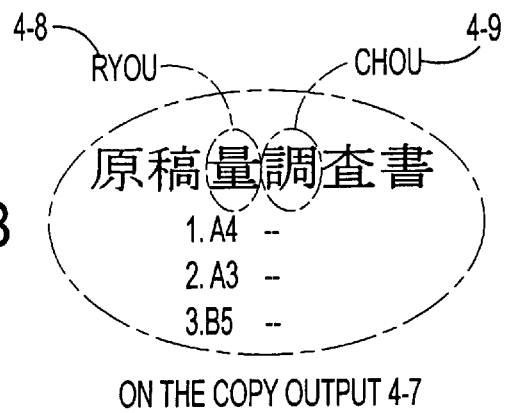
FIG. 4B is an enlarged part of the input image from FIG. 3 when correction is applied.
Figure 5B:
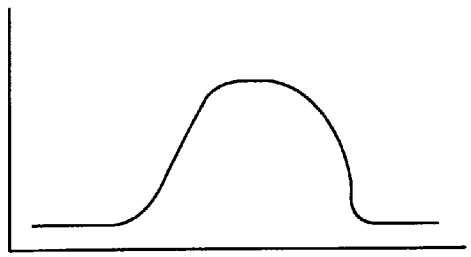
Figure 5C:
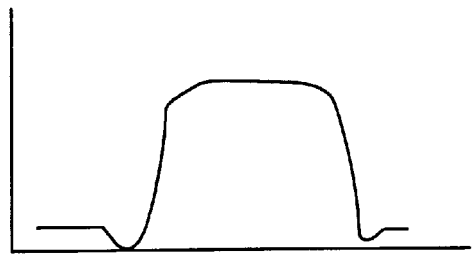

Furthermore, the edge determinator 5 performs local area determination and determines the presence of an edge. In the case of a text area, where an edge is detected, a determination signal indicating the existence of an edge is transmitted as a control signal to the linear High-γ converter 1-13, the tone controller 1-14, and the raster output scanner 1-15. Then, the waveform shown in FIG. 5(c) is input to the linear High-γ converter 1-13, and is High-γ processed as a text area. Next, the image signal input to the tone controller 1-14 is processed using a Look-Up Table for text, and output to the raster output scanner 1-15. Then, in the raster output scanner 1-15, processing using a text use screen (for example, a 400 line screen) is performed, and as shown in FIG. 4B optimal text is reproduced as the result by the copy output section 4-9 corresponding to section 4-6 of the original document.

Next, in one enlarged section 2-2 in the original document 2-1, the focus is on the character, ryou, in section 4-5 of section 4-4 in the original document in FIG. 4A. This kind of text character is one in which errors in T/I separation determination occur relatively easily. As shown in FIG. 5(a), the waveform of the image signal input into the digital filter unit 1-12 hypothesizes a case in which the text portion is determined to be an image as a result of erroneous T/I separation.

At this point, when the operation of the edge determinator 5 is not added, the determination result of the T/I separation determinator is received, and a process corresponding to the image area in the IPS-CPU unit 1-9 commands each section to perform. This results in smoothing of the image area, resulting in the waveform shown in FIG. 5(b). This waveform is input to the linear High-γ converter 1-13, and linear conversion is performed, processing the image area. This is then input into the tone control unit 1-14, and upon being processed according to a Look-Up Table for image areas, is output to the raster output scanner 1-15. In the raster output scanner, an image area use screen (for example, a 200 line screen) which complies with the determination of the T/I separation determinator 1-8 is selected. The result for the character, ryou of section 4-8 of the copy output 4-7 of FIG. 4B, corresponding to section 4-5 of the original document, optimal character reproduction cannot be performed.

On the other hand, in this embodiment, in compliance with FIG. 1 and the digital filter unit 1-12 discussed above, an attempt is made to control the process using the determination signal of the T/I separation determinator 1-8 and the determination results of the edge detection determinator 5 which complies with the linear High-γ converter 1-13, the tone controller 1-14, and the raster output scanner 1-15.

Figure 6A:
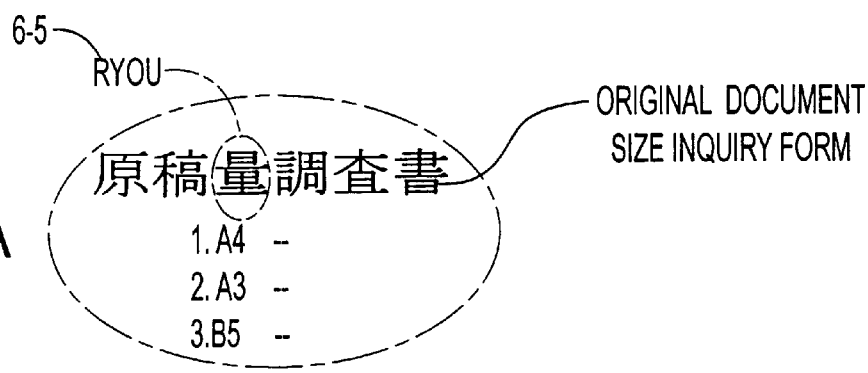
FIG. 6A is an enlarged part of the input image from FIG. 3.
Figure 7A:
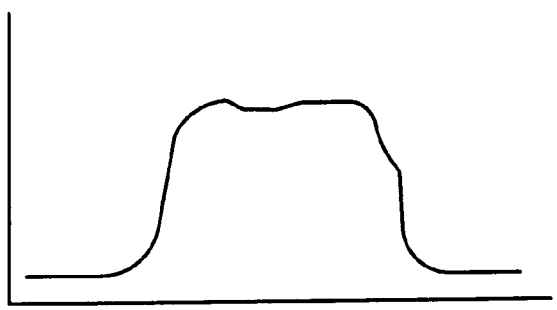
FIGS. 7A–7C are waveform figures showing examples of image signals.
Figure 7B:
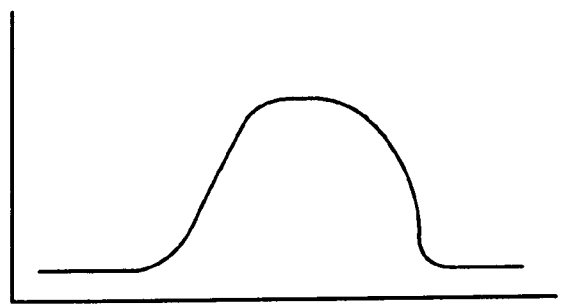

When the original document 2-1 shown in FIG. 3 is read, for the character, ryou 6-5, see FIG. 6A, that is part of the text, as explained above, errors in the T/I separation determination occur relatively easily. This problem is solved, for example, when the waveform of the image signal input into the digital filter unit 1-12 is as shown FIG. 7(a), and the waveform of FIG. 7(a) becomes a waveform shown in FIG. 7(b) when the text part, resulting from the T/I separation error, is determined to be an image area and the smoothing process is performed.

Figure 6B:
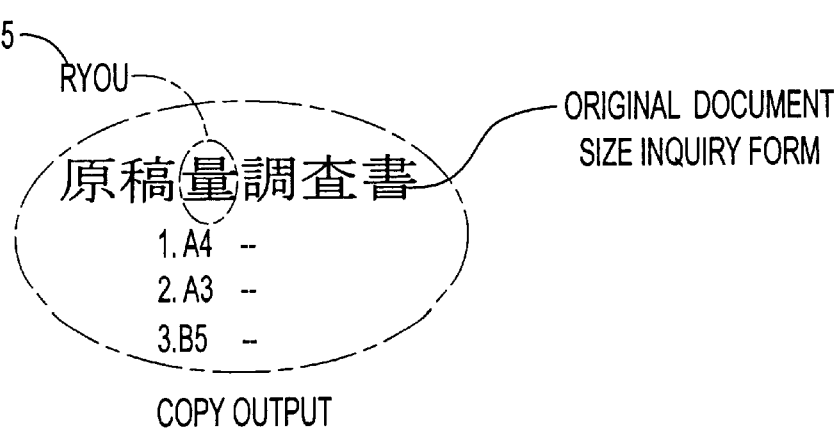
FIG. 6B is an enlarged part of the input image from FIG. 3 when correction is applied.

In this case, the edge determinator 5 performs local area determination of the edge part of the text on the input side of the digital filter 1-12. Specifically, the edge part is determined based on the waveform of FIG. 7(a) before the smoothing process, and accurate edge detection can be performed. Then, once the edge is detected in the edge determinator 5, the linear High-γ converter 1-13 receives an edge determination signal, High-γ conversion processing is performed on the image signals, and the contour of the character is made prominent. Next, the image signal is input into the tone control unit 1-14, conversion processed by the Look Up Table for text use, and then sent to the raster output scanner 1-15. The raster output scanner receives the edge determination signal, selects a text use screen (for example, a 400 line screen), and continues processing. The results of the above processing, as shown in part 6-7 of the copy output in FIG. 6B, is such that optimum text reproduction can be realized.

Additionally, in the above operation, when an image area is detected, generally the edge is not detected, so a no-edge determination signal is output from the edge determinator. As a result, the linear High-γ converter 1-13, the tone control 1-14 and the raster output scanner 1-15 perform processing corresponding to each image area.

Figure 7C:
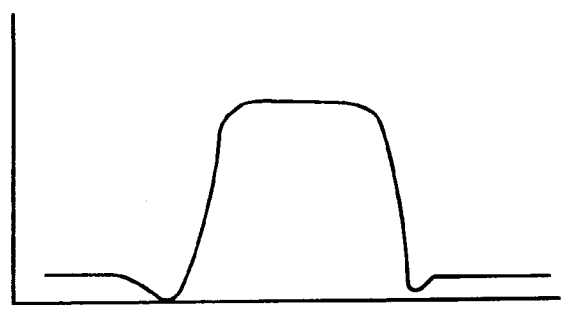

Furthermore, a digital filter can be added to the last step of the linear High-γ converter 1-13. In the example described above, and in the digital filter of this final step, text-use filter processing is performed based on the edge determination signal of the edge determinator 5. The output waveform in this case is shown in FIG. 7(*c*), where the text contour is distinct.

As described above, according to this first embodiment, even if the T/I determination is erroneous, the text contour can be presented clearly, and the reproduction ability for design areas is also improved compared to a case in which an edge detection function only is used, and as a result, improvement in reproduction ability of the whole can be realized.

The following explains the characteristics of the second embodiment with reference to the drawings. The figures are block diagrams which show the structure of the necessary elements in embodiment 2. Many structural elements are similar to the above described embodiment 1, so the same part numbers have been used that correspond to parts in FIG. 1, and explanation of these parts is therefore omitted.

Figure 8:
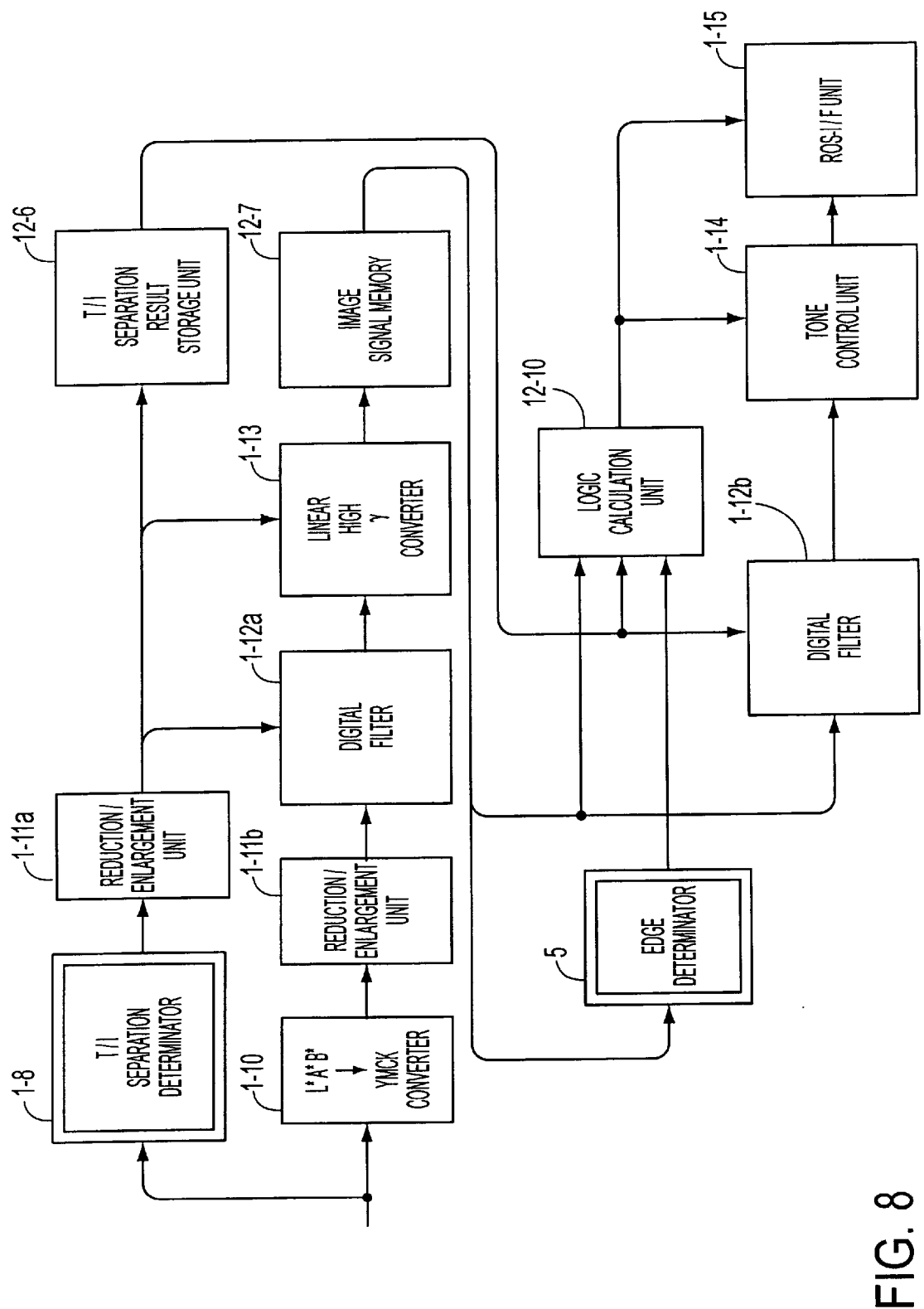
FIG. 8 is a block diagram showing the composition of essential parts of the image processing device in the second embodiment of the invention.

The T/I separation result storage unit 12-6 shown in FIG. 8 is a combination of memory and a compression processing circuit, wherein the determination results of the T/I separation determinator 1-8 are completed and temporarily stored.

The T/I determination result stored by the T/I separation result storage unit 12-6 is supplied as a calculation signal to the calculation unit 12-10, and at the same time is also supplied as a control signal to the digital filter 1-12 (*b*).

In addition, the image signal memory 12-7 stores the image signal resulting from the linear High-γ converter 1-13 processing, and this resultant image signal is supplied to the edge determinator 5, to the logic calculator 12-10, and to the digital filter 1-12 (*b*). The digital filter 1-12 (*b*) performs border line smoothing for image areas and for text areas, and performs the emphasizing and the like of the edge part of the resultant image signal read-out from the image signal memory 12-7.

Figure 9:
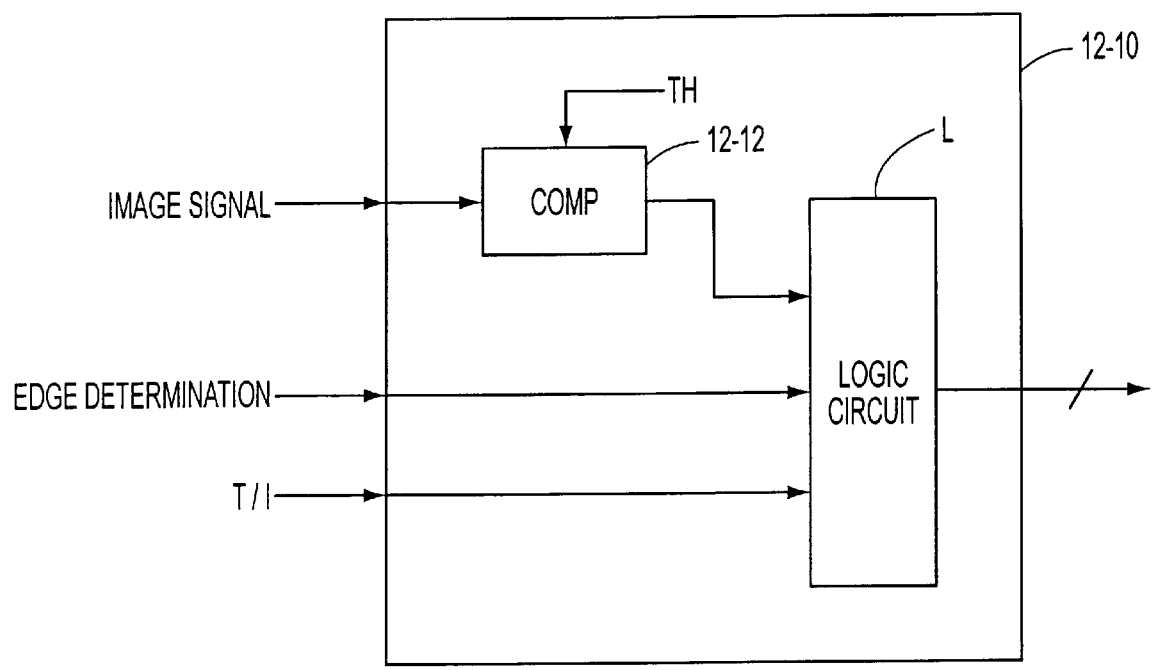
FIG. 9 is a block diagram showing the composition of the logic calculator 12-10 of the second embodiment of the invention.

Next, the logic calculator 12-10, having a structure shown in FIG. 9, performs a logic calculation based on the image signal, the edge determination signal and the text/image determination results. The COMP 12-12 shown in FIG. 9, compares the image signal with the fixed threshold TH, and supplies the comparison results to the logic circuit L. The logic calculation circuit L is composed of a combination of assorted logic gates which perform specified logic calculations. In this example of the logic calculations of the logic calculation circuit L, the output signal is set corresponding to the conditions of the image (conditions of text, image, color text, and the like), and compensates for an image condition determination of an inappropriate value occurring by the T/I determination results alone. The output signal of the logic calculation circuit L, that is the output signal of the logic calculator 12-10, is supplied, in this embodiment, to the tone control circuit 1-14 as a control signal of 4 bits, and to the raster output scanner 1-15 as a control signal of 1 bit or 2 bits. Specifically, in the tone control circuit 1-14, processing for 16 kinds of image conditions is performed, and in the raster output scanner 1-15, processing for two or four kinds of image conditions is performed.

Figure 10:
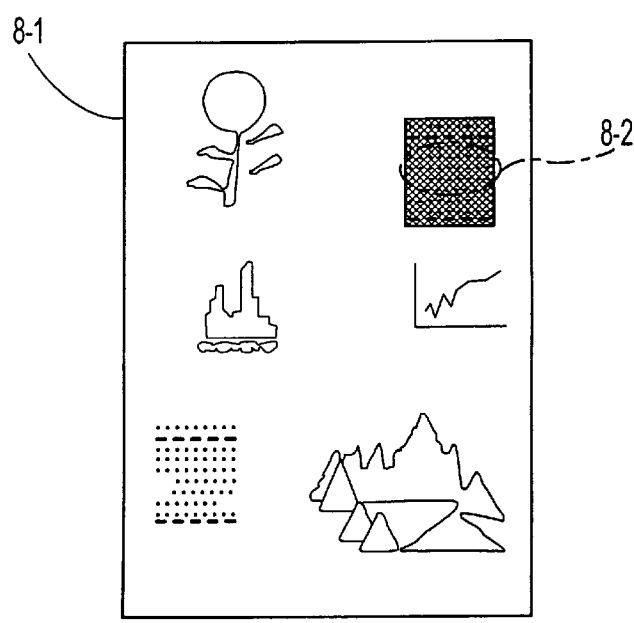
FIG. 10 shows an example of an input image.

The following explains the operation of the second embodiment according to the above mention structure, when an original document, as shown in FIG. 10, is read.

Figure 11A:
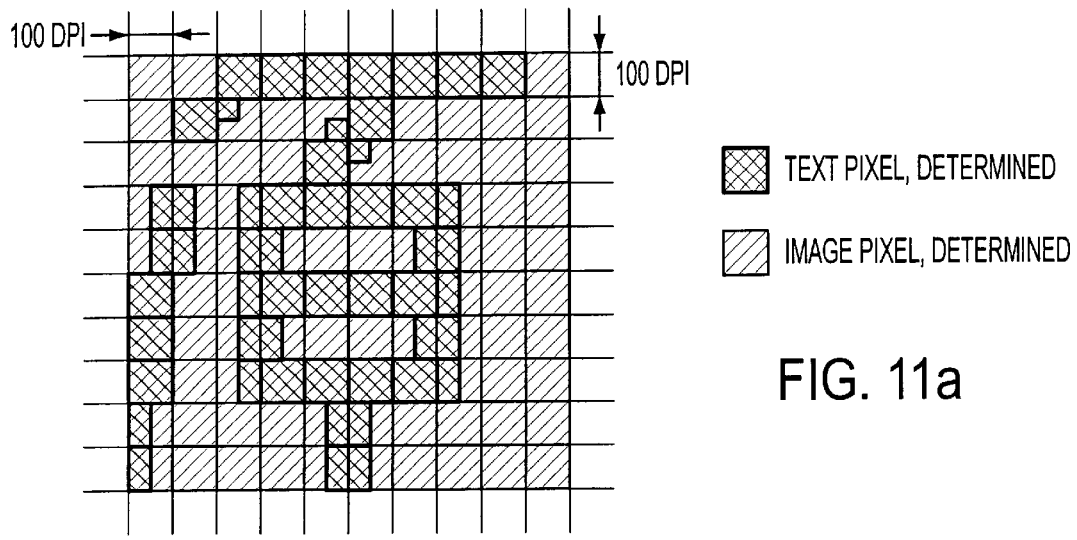
FIGS. 11A–11C are examples of text/image separation determination results.
Figure 11B:
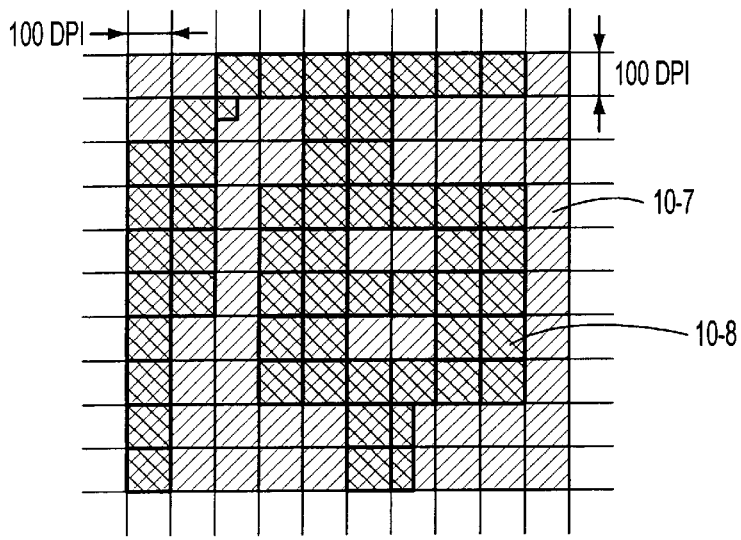
Figure 11C:
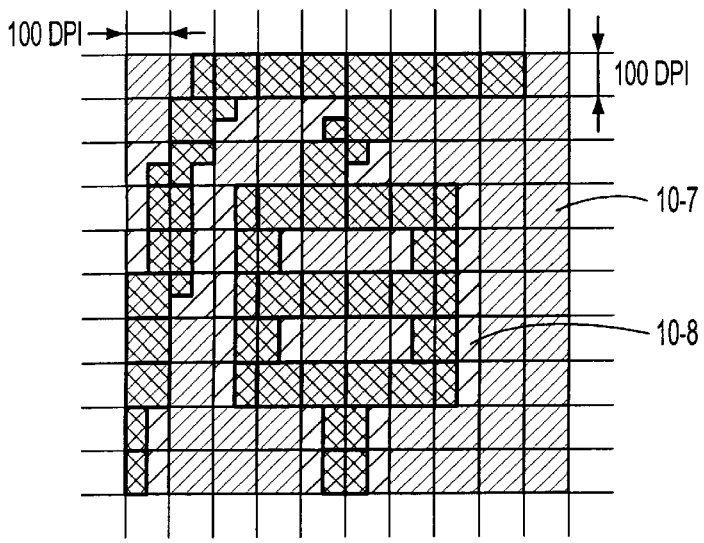
Figure 12:
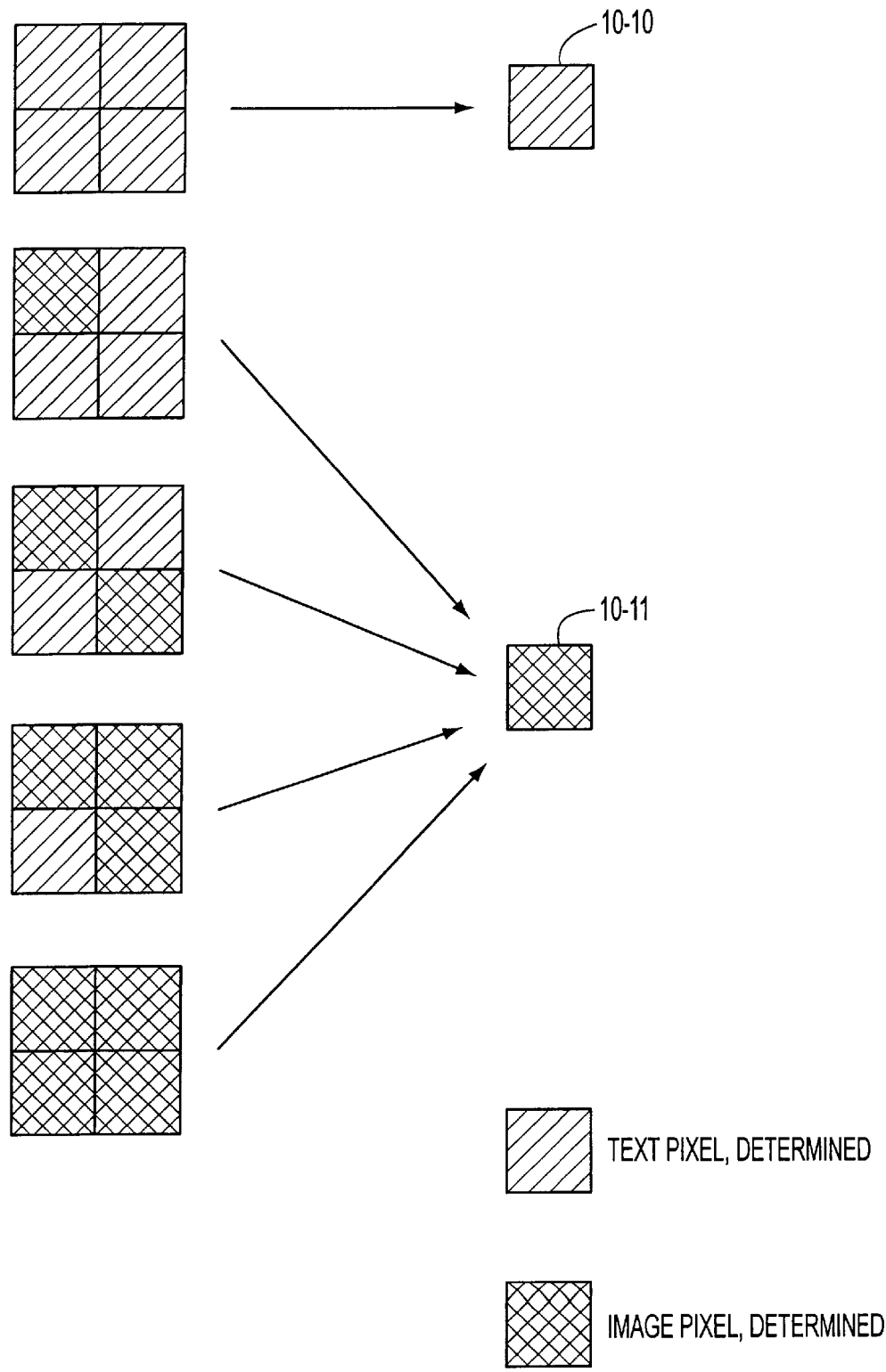
FIG. 12 shows compression processing when the text/image separation determination results are compression stored.

In the original document 8-1, the focus is to show text in section 8-2 which is written on a faint background. When the T/I determination result for text in this section is as shown in FIG. 11(*a*), the T/I separation result storage unit 12-6, which stores the determination result, performs compression processing in order to reduce the amount of data stored, and results in, for example, the stored contents as shown in (b) of the same figure. This is because, in this embodiment, simple ¼ compression/decompression performed, and as shown in FIG. 12, if there is even one text determination (text area) in the 4×4 matrix, then a method is used in which the entire matrix is defined as a text area.

Meanwhile, the image signal performs filter processing for text or image based on the determination result, for example refer to FIG. 11(*a*), of the T/I separation determinator 1-8 in the digital filter unit 1-12 of the prior steps, and performs the linear conversion for an image and High-γ conversion for text complying with the determination result of the T/I separation determinator 1-8, which is also in the linear High-γ converter 1-13. Then, an image signal which has received such processing is stored in the image signal memory 12-7.

The following considers processing for a case in which the edge determinator 5 and the logic calculator 12-10 are not supplied (in the case of a prior art device).

First of all, if readout is required, readout begins from the image signal memory 12-7 and T/I separation results storage unit 12-6. The image signal is input into the digital filter 1-12 (*b*), and filter processing is performed by the content of the T/I separation results storage unit 12-6. Moreover, the image signal is processed by means of the contents of the T/I separation results storage unit 12-6 in the tone control unit 1-14 and in the raster output scanner 1-15.

These results, as in part 10-8 of FIG. 11(*a*), in spite of being an image area, receive the influence of the compression/decompression result of the T/I signal, and text area processing is performed. For that reason, text use processing is performed in the digital filter processing, Linear/High-γ processing and tone control processing, and high image quality cannot be obtained.

Figure 13:
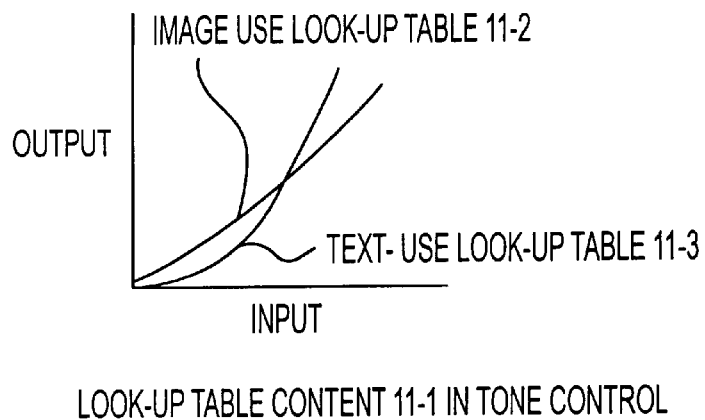
FIG. 13 shows the characteristics of the image-use look-up table and the text-use look-up table.
Figure 14A:
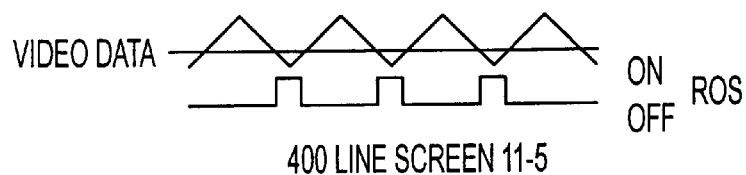
FIG. 14A shows the exposure time in the raster output scanner for a 400 line screen image.
Figure 14B:
FIG. 14B shows the exposure time in the raster output scanner for a 200 line screen image.

For example, in the tone control unit 1-14 the text-use look-up table is used; however, as shown in FIG. 13, compared to the image-use look-up table, there is a drop in the gradient property. Moreover, as distinguished from FIG. 13, for an area in which the image part is of low density, the value becomes lower than the actual density. As such, an image signal of lower density than the real image is fed into the raster output scanner 1-15, and reproduced on the text-use screen (for example, a 400 line screen). This is because the exposure time of the raster output scanner shortens, and a white space or a lower density is produced. In FIG. 14(*a*), the exposure time for when a text-use 400 line screen is shown, and in FIG. 14(*b*), the exposure time for when an image-use 200 line screen is shown. As determined from this figure, the exposure time of the ROS beam in the time of the 400 line screen as compared with the time of the 200 line screen is substantially shorter.

Meanwhile, in this embodiment, as shown in FIG. 8, the T/I separation determination results are used in the digital filter 1-12 (*a*) of the preceding steps, the linear High-γ converter 1-13, and the digital filter 1-12 (*b*), and for the tone control unit 1-14 and the raster output scanner 1-15, and the calculation results of the logic calculator 12-10 based on the edge determination results are used. Accordingly, the tone control unit 1-14 and the raster output scanner 1-15 are controlled by means of the signal output by the logic calculator 12-10. That is, signal based on edge detection, so the processing contents are appropriate for the image condition.

With respect to the logic calculator 12-10, it is possible to achieve specified results by a composition in which the edge determination result is output as through data. Alternatively, this specified result can be achieved by a composition that omits the logic calculator 12-10 and uses the output signal of the edge determinator 5. The following explains a case in which the tone controller 1-14 and the raster output scanner 1-15 are controlled using only edge determination results.

Figure 15A:
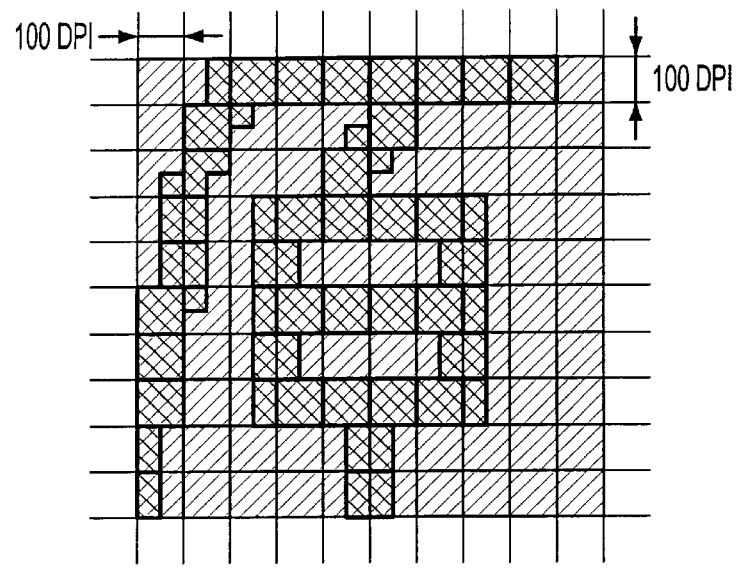
FIGS. 15A–15B shows the edge determination results and the last output image in the second embodiment of the invention.
Figure 15B:
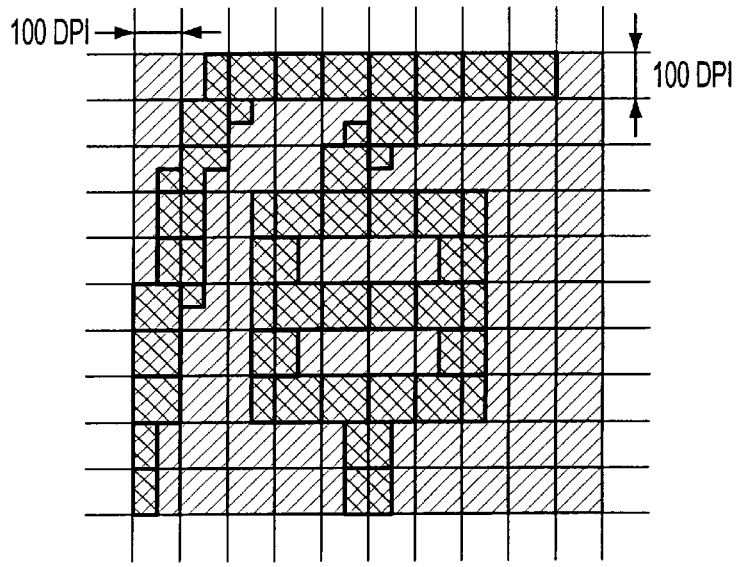

In section 8-2 of the original document shown in FIG. 10, text is written on a light-colored background, so the T/I separation determination results as described above are as shown in FIG. 11(*a*), and the determination results compression stored in the T/I separation results storage unit 12-6 are shown in (b) of the same figure. Meanwhile, the image signal is input into the digital filter 1-12*b* via the image signal memory 12-7, and filter processing is performed in compliance with the contents of the T/I separation results storage 12-6. Next, the image signal is processed not by the contents of the T/I separation results storage unit 12-6 in the tone control unit 1-14, but by means of the edge determination results for the contents of the image signal memory 12-7. Thus, by means of the edge determinator 5, an edge is detected as shown in FIG. 15(*a*), and according to these detection results, the look-up table of the tone controller 1-14 is selected. Accordingly, suitable processing is performed corresponding to the image conditions. Then, a screen is selected based on the edge detection results also in the raster output scanner 1-15, and as a result, shown in FIG. 15(*b*), white spaces (or reduced density) around the text on a faint colored background can be prevented.

The above example uses a case in which determination results of the edge determinator 5 are used in place of logic calculation results of the logic calculator 12-10. However, in the logic calculator 12-10, because the logic calculation is carried out based on the T/I determination results and the image signal in addition to the edge determination results, the image condition can be detected in detail, and more accurate control can be performed in accordance with the setting method of this calculation.

In the second embodiment explained above, and in the case of compression storage of the T/I separation signal, by means of an edge determinator positioned after the memory temporarily storing the image signal, accordingly performing the look-up table selection of the tone controller, and the screen selection of the raster output scanner, it is possible to prevent, for example, white spaces (or reduction in density) around text on a faint colored background.

Furthermore, the T/I separation results and the edge determination results are used to perform logic calculations, and based on image quality correction using these results, image creation can be performed according to the image conditions.

As discussed above, this invention comprises a first determination means for performing image area separation for the input image data according to broad scope determination of the input image data, a first image quality correction means for performing the image quality correction for the input image data based on the image area separation results, a second determination means for determining the image characteristics by performing local area determination for the input image data, and a second image quality correction means for performing image quality correction based on the image characteristics determined by the second determination means in regard to the image data corrected by the first image quality correction means. As a result, even if an error occurs in image area separation by means of the first determination means, appropriate modifications can be made by the second determination means and the second image quality correction means to achieve high image quality.

Moreover, a logic calculation means is provided to perform logic calculation using at least the determination results of first and second determination means, so as to perform the image quality correction for the image data corrected by the first image quality correction means based on the calculation results of the logic calculation means. As a result, detailed control can be carried out corresponding to image conditions.

What is claimed is:

1. An image processing device for processing input image data, comprising:
    first determination means for performing coarse image area separation of the input image data;
    first image quality correction means for performing image quality correction on said input image data based on the coarse image area separation result;
    second determination means for determining fine image characteristics for the input image data; and
    second image quality correction means for performing fine image quality correction on the image data corrected by said first image quality correction means based on said coarse image area separation result and said image characteristics.

2. The image processing device of claim 1, wherein the first determination means perform separation determination of an image area and a text area, and the second determination means performs edge determination.

3. The image processing device of claim 1, wherein the input image data, having as its subject the determination of said second determination means, is input image data after being corrected by said first image quality correction means.

4. An image processing device for processing input image data, comprising:
    first determination means for performing coarse image area separation of the input image data;
    first image quality correction means for performing a image quality correction on said input image data based on the coarse image area separation result;
    second determination means for determining fine image characteristics for the input image data;
    logic calculation means for performing a logic calculation using the results of the first and second determination means, and
    second image quality correction means for performing fine image quality correction on the image data corrected by the first image quality correction means based on the calculation results of said logic calculation means.

5. The image processing device of claim 2, wherein the input image data, having as its subject the determination of said second determination means, is input image data after being corrected by said first image quality correction means.

* * * * *